(12) United States Patent
Tanaka (10) Patent No.: US 11,453,154 B2
(45) Date of Patent: Sep. 27, 2022

(54) METHOD OF MANUFACTURING LIQUID CONTAINER

(71) Applicant: YOSHINO KOGYOSHO CO., LTD., Tokyo (JP)

(72) Inventor: Toshimasa Tanaka, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 66 days.

(21) Appl. No.: 16/612,268

(22) PCT Filed: May 7, 2018

(86) PCT No.: PCT/JP2018/017604
§ 371 (c)(1),
(2) Date: Nov. 8, 2019

(87) PCT Pub. No.: WO2019/003637
PCT Pub. Date: Jan. 3, 2019

(65) Prior Publication Data
US 2021/0154907 A1 May 27, 2021

(30) Foreign Application Priority Data
Jun. 30, 2017 (JP) ............................. JP2017-129863

(51) Int. Cl.
*B29C 49/46* (2006.01)
*B65D 1/02* (2006.01)
(Continued)

(52) U.S. Cl.
CPC ............ *B29C 49/46* (2013.01); *B65D 1/0292* (2013.01); *B29C 2049/4664* (2013.01);
(Continued)

(58) Field of Classification Search
CPC . B29C 49/46; B29C 2049/4664; B29C 49/28; B29C 49/58; B29C 2049/465;
(Continued)

(56) References Cited

U.S. PATENT DOCUMENTS 4,079,111 A * 3/1978 Uhlig ...................... B29C 53/30
264/507
9,789,641 B2 * 10/2017 Suyama .................. B29C 49/58
(Continued)

FOREIGN PATENT DOCUMENTS

JP 2000-043129 A 2/2000
JP 2001-072030 A 3/2001
(Continued)

OTHER PUBLICATIONS

May 29, 2018 International Search Report issued in International Patent Application No. PCT/JP2018/017604.
(Continued)

*Primary Examiner* — Jeffrey M Wollschlager
*Assistant Examiner* — Shibin Liang
(74) *Attorney, Agent, or Firm* — Oliff PLC (57) ABSTRACT

A method of manufacturing a liquid container in which a liquid is stored in a storage space of the container including a mouth, a body and a bottom, the body having a lateral folding line portion being foldable when the body is flattened in a thickness direction and extending in a circumferential direction of the body, the method including a liquid blow molding step of molding a container filled full with a liquid in a storage space by placing a preform in a mold and performing liquid blow molding; and a headspace forming step of forming a headspace in which, by separating the container filled with a liquid from the container, the body is
(Continued)

deformed in a direction in which a thickness is increased in an area of the lateral folding line portion and a volume of the storage space is increased.

18 Claims, 6 Drawing Sheets

(51) Int. Cl.
  *B29K 23/00* (2006.01)
  *B29K 67/00* (2006.01)
  *B29L 31/00* (2006.01)
(52) U.S. Cl.
  CPC .... *B29K 2023/12* (2013.01); *B29K 2067/003* (2013.01); *B29L 2031/7158* (2013.01); *B65D 2501/0081* (2013.01)
(58) Field of Classification Search
  CPC .......... B29C 2049/4655; B65D 1/0292; B65D 2501/0081; B29B 2911/1436; B29K 2023/12; B29K 2067/003; B29L 2031/7158
  See application file for complete search history.

(56) References Cited

U.S. PATENT DOCUMENTS

| | | | |
|---|---|---|---|
| 2015/0076105 A1* | 3/2015 | Sato | B29C 49/78 53/111 R |
| 2015/0328823 A1* | 11/2015 | Kannengiesser | B65B 3/022 206/525 |

FOREIGN PATENT DOCUMENTS

| | | | |
|---|---|---|---|
| JP | 2001-114284 A | 4/2001 | |
| JP | 2003-034321 A | 2/2003 | |
| JP | 2014-069441 A | 4/2014 | |
| JP | 2014-156049 A | 8/2014 | |
| WO | 2014082026 * | 5/2014 | B65D 1/02 |
| WO | 2017/090340 A1 | 6/2017 | |

OTHER PUBLICATIONS

Feb. 23, 2021 Extended European Search Report issued in European Patent Application No. 18824776.1.

* cited by examiner

FIG. 7

METHOD OF MANUFACTURING LIQUID CONTAINER

TECHNICAL FIELD

The present disclosure relates to a method of manufacturing a liquid container that includes a mouth, a body and a bottom and is formed by liquid blow molding.

BACKGROUND

Synthetic resin containers, representatives of which are polypropylene (PP) bottles and polyethylene terephthalate (PET) bottles, are used in applications in which a variety of liquids such as beverages and toiletries including cosmetics, chemicals, detergents, shampoos or the like are contained as a content liquid. Such containers are generally manufactured by blow molding a preform formed into a bottomed tubular shape by a thermoplastic synthetic resin material.

As the blow molding in which a preform is molded into a container, the liquid blow molding is known, in which, as a pressurized medium supplied into a preform, a pressurized liquid is used instead of pressurized air.

For example, Patent Literature 1 (PTL 1) discloses a liquid blow molding method in which a preform heated in advance to a temperature at which stretchability is achieved is placed into a mold for blow molding and a liquid pressurized to a predetermined pressure is supplied into the preform through a nozzle. In this manner the preform is molded into a container having a predetermined shape conforming to a cavity of the mold. In the above described liquid blow molding method, as a liquid supplied into a preform, a content liquid such as a beverage to be contained finally in a container as a product is used, and molding of a container and filling of a content liquid into the container are performed at the same time. In this manner, a step of filling a content liquid into a container after molding is omitted, and constitution of the production process and production line (apparatus) can be simplified.

CITATION LIST

Patent Literature

PTL 1: JP2000043129 (A)

SUMMARY

Technical Problem

In the case of the above described liquid blow molding method, a mouth of a container right after blow molding is filled full with a liquid up to a top opening of the mouth. In such a fully filled state, when the container is ejected from a blow molding mold or when the container is transferred to a position where a capping process and the like is performed, for example, a content liquid may be spilled out of the mouth. Or when the mouth is closed by a cap when the container is fully filled, a content liquid may be spilled out when the cap is opened.

Thus, in order to prevent a content liquid from unintentionally flowing out of a container as described above, it has been considered that a headspace (a space not filled with a liquid) is formed in the upper part of the container after liquid blow molding. For example, it has been considered that a headspace is formed by adopting a suck back process in which a part of a liquid filled in a container is sucked back to a liquid supply side after the container is molded.

However, in the above described method, a mechanism is required to suck back a part of the liquid filled in the container to the supply side of the liquid after the liquid blowing, which causes a production process to be complicated and an increase in facility cost.

It is therefore an object of the present disclosure to provide a method of manufacturing a liquid container that has a simple structure and capable of being formed therein a desired sized headspace.

Solution to Problem

A disclosed liquid container manufacturing method is a method of manufacturing a liquid container configured to store a liquid in a storage space of the container that includes a mouth, a body and a bottom, the body having a lateral folding line portion being foldable when the body is flattened in a thickness direction and extending in a circumferential direction of the body, the method including:

a liquid blow molding step of molding a container having the storage space filled full with a liquid by placing a preform in a mold and performing liquid blow molding; and a headspace forming step of forming a headspace in which, by separating the container filled with a liquid from the mold, the body is deformed in a direction in which the thickness is increased in an area of the lateral folding line portion and a volume of the storage space is increased.

It is to be noted that, in the disclosed liquid container manufacturing method, it is preferable that the body has a flattened shape in which a width is larger than a thickness.

It is also preferable that, in the disclosed liquid container manufacturing method, the lateral folding line portion forms a recessed bent portion in the thickness direction of the body.

It is also preferable that, in the disclosed liquid container manufacturing method, the lateral folding line portion is provided at a lower half of the body.

It is also preferable that, in the disclosed liquid container manufacturing method, the body has a front wall and a rear wall disposed opposite to each other in the thickness direction of the body; and the lateral folding line portion is provided to each of the front wall and the rear wall.

Further, the disclosed liquid container manufacturing method is a liquid container manufacturing method in which a liquid is stored in a storage space of a container that includes a mouth, a body and a bottom, the body having a bellows portion being expandable and contractible in a direction perpendicular to a central axis of the body; the method including:

a liquid blow molding step of molding a container having the storage space filled full with a liquid by placing a preform in a mold and performing liquid blow molding; and a headspace forming step of forming a headspace in which, by separating the container filled with a liquid from the mold, the bellows portion is expanded and a volume of the storage space is increased.

Further, it is preferable that, in the disclosed liquid container manufacturing method, the bellows portion is provided over an entire height direction of the body.

Advantageous Effect

According to the present disclosure, a method of manufacturing a liquid container having a simple structure and capable of being formed therein a desired sized headspace can be provided.

DETAILED DESCRIPTION

The present disclosure will be described in more detail below with reference to the drawings.

A synthetic resin container 1 (hereinafter referred to also as a "container 1") that can be formed by a liquid container manufacturing method according to an embodiment of the present disclosure illustrated in FIGS. 1 to 5 has a tubular mouth 10, a shoulder 11 continuous to the lower end of the mouth 10 and expanding radially outward, a body 12 continuous to the outer peripheral edge of the shoulder 11 and extending downward, and a bottom 13 continuous to the lower end of the body 12. Inside the container 1 is a storage space configured to store contents. FIG. 2 is a front view of the container 1 viewed from a short axis direction of a flattened body 12 and FIG. 3 is a side view of the container 1 viewed from a long axis direction.

The mouth 10 is formed into a cylindrical shape, and its outer periphery is provided with a male thread 10a to which a cap or a dispensing plug is mounted. Further, a neck ring 10b is provided below a male thread 10a, and the container 1 can be transferred by supporting the lower side of the neck ring 10b by a transfer apparatus, for example. Further, a top opening 10c of the mouth 10 is an outflow port for contents and can be closed by mounting a cap or the like thereto.

The shoulder 11 connects the mouth 10 and the body 12, and forms an inclined surface that inclines downward relative to a surface perpendicular to a central axis line C of the container 1. It is to be noted that, in this example, the shoulder 11 is formed by a substantially flat inclined surface in which a contour line is linear in the front view (see FIG. 2) and the side view (see FIG. 3), but is not limited thereto, and may be formed into a dome shape bulging outward from the container 1 or may be a flat surface perpendicular to the central axis line C.

Figure 4:
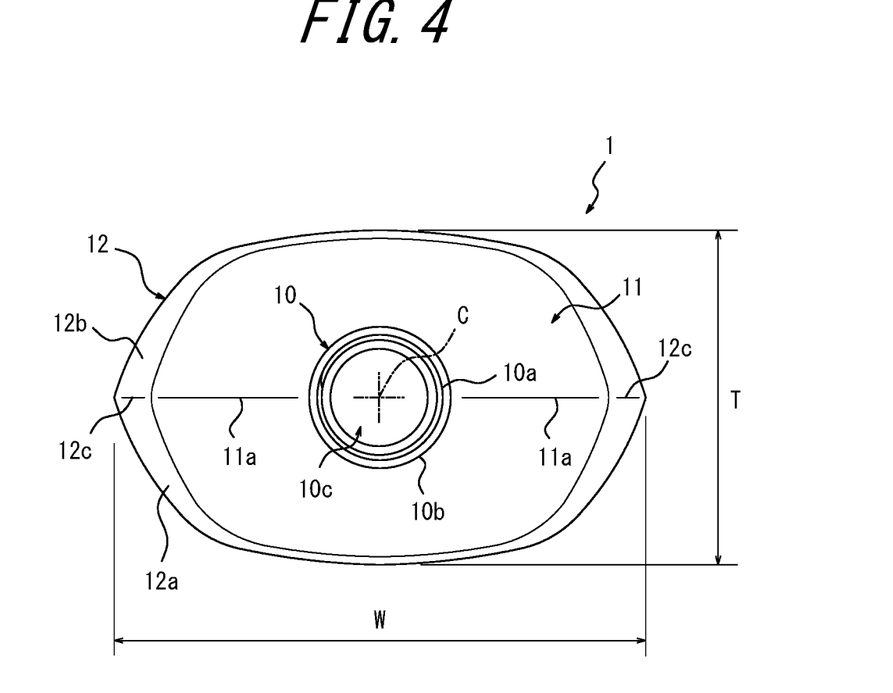
FIG. 4 is a plan view of the synthetic resin container illustrated in FIG. 1.
Figure 5:
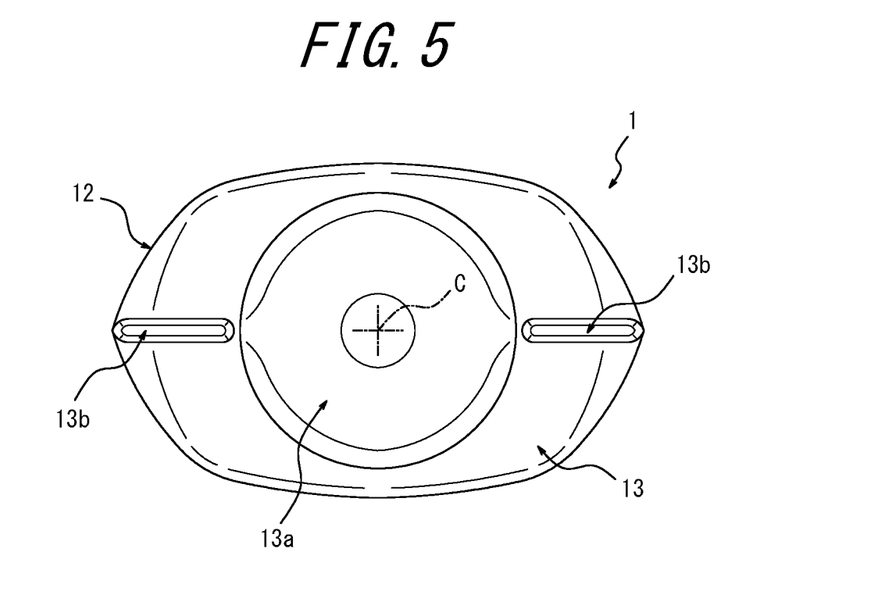
FIG. 5 is a bottom view of the synthetic resin container illustrated in FIG. 1.

As illustrated in a plan view in FIG. 4, the body 12 has a flattened shape in which a width (a length of the body 12 in the long axis direction) larger than a thickness (a length of the body 12 in the short axis direction). It is to be noted that the body 12 may include a non-flat portion (a portion where the thickness and the width are the same), or the body may be entirely formed of a non-flat portion (a portion where the thickness and the width are the same). In FIG. 4, T represents the maximum thickness and W represents the maximum width of the body 12.

The body 12 has a front wall 12a and a rear wall 12b opposite to each other in the thickness direction across the central axis line C. Each boundary between the front wall 12a and the rear wall 12b is provided with a longitudinal folding line 12c that acts as a mountain crease when the body 12 is flattened. This enables the body 12 to be easily flattened in the thickness direction (short axis direction) such that the front wall 12a and the rear wall 12b are close to each other. It is to be noted that, in this example, each longitudinal folding line 11a continuous to each longitudinal folding line 12c is also provided to the shoulder 11, which enables the shoulder 11 to be also easily flattened with the body 12 in the thickness direction. In this manner, the container 1 is formed such that it can be folded entirely by flattening the body 12 and the shoulder 11 after the contents are used up.

The body 12 is provided with a lateral folding line portion 14 extending in the circumferential direction of the body 12. The lateral folding line portion 14 acts as a valley crease when the body 12 is flattened in the thickness direction, and can be a starting point of folding. It is to be noted that the lateral folding line portion 14 can act also as a mountain crease.

In this example, the lateral folding line portions 14 are provided on the lower half (half portion on the bottom 13 side) of the body 12, and the shape thereof on the front wall 12a is the same as that of on the rear wall 12b. In this manner, each of a pair of lateral folding line portions 14 disposed opposite to each other in the thickness direction of the body 12 is connected to each other at the boundaries (longitudinal folding lines 12c) between the front wall 12a and the rear wall 12b. Thus, the lateral folding line portions 14 of this example extend all over the circumference of the body 12 in the circumferential direction. The lateral folding line portions 14 may be provided on the upper half of the body 12, or a plurality of pairs of lateral folding line portions may be provided at intervals in the height direction of the container 1. Further, the lateral folding line portion 14 may be provided such that it extends only over a part of the circumferential direction of the body 12. Moreover, the lateral folding line portion 14 may be provided to only either one of the front wall 12a and the rear wall 12b.

In this example, the lateral folding line portion 14 is formed into a wavy line gently curving along the circumferential direction of the body 12 as illustrated in the front view in FIG. 2, but is not limited thereto, and may extend in a linear or an arc-like manner along the circumferential direction of the body 12. Further, as illustrated in the side view in FIG. 3, at the connecting portion 14a where each of a pair of lateral folding line portions 14 is connected to each other, a protruding bending portion is formed downward from the connecting portion 14a as a vertex.

Further, in the side view illustrated in FIG. 3, the lateral folding line portions 14 form a recessed bending portion in the thickness direction of the body 12. In particular, the thickness of the area above the lateral folding line portion 14 of the body 12 is gradually reduced downward (toward the lateral folding line portion 14), and the thickness of the area below the lateral folding line portion 14 is gradually reduced upward (toward the lateral folding line portion 14).

The body 12 is configured so as to be deformed such that the volume of the storage space is increased (expanded) by the inner pressure (hydraulic head pressure) of the liquid filled in the storage space. More specifically, when being separated from the blow molding mold, the body 12 is deformed, by the inner pressure of the liquid filled in the storage space, in the direction in which the thickness thereof is increased, in the area of the lateral folding line portion 14 illustrated by arrows in FIG. 3. In this context, the contour line of the body 12 indicated by the solid line in FIG. 3 represents a shape (molded shape) of the body 12 molded conforming to the inner surface shape in the cavity of the blow molding mold before the mold is opened (before the container 1 is separated from the mold). Moreover, the contour line 12' of the body indicated by the double dotted chain line in FIG. 3 illustrates a state where the body 12 is deformed (expanded) in the direction in which the thickness of the body 12 is increased by opening the mold and separating the container 1 from the mold. In this manner, an increase in the volume of the storage space is caused by the deformation in which the thickness of the flattened body 12 is increased, that is, the deformation in which the flatness degree is reduced (a difference between the thickness and the width is reduced).

Figure 1:
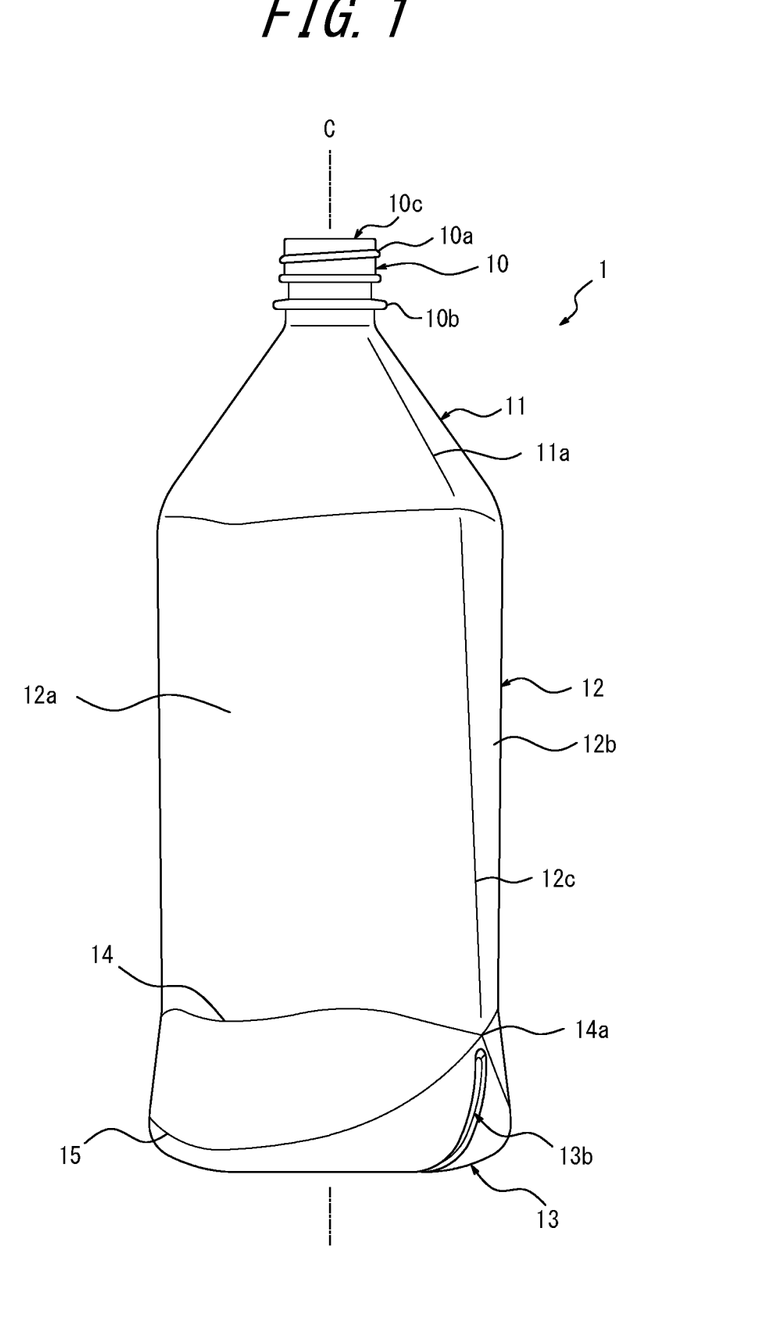
FIG. 1 is a perspective view of a synthetic resin container that can be formed by a liquid container manufacturing method according to an embodiment of the present disclosure.
Figure 2:
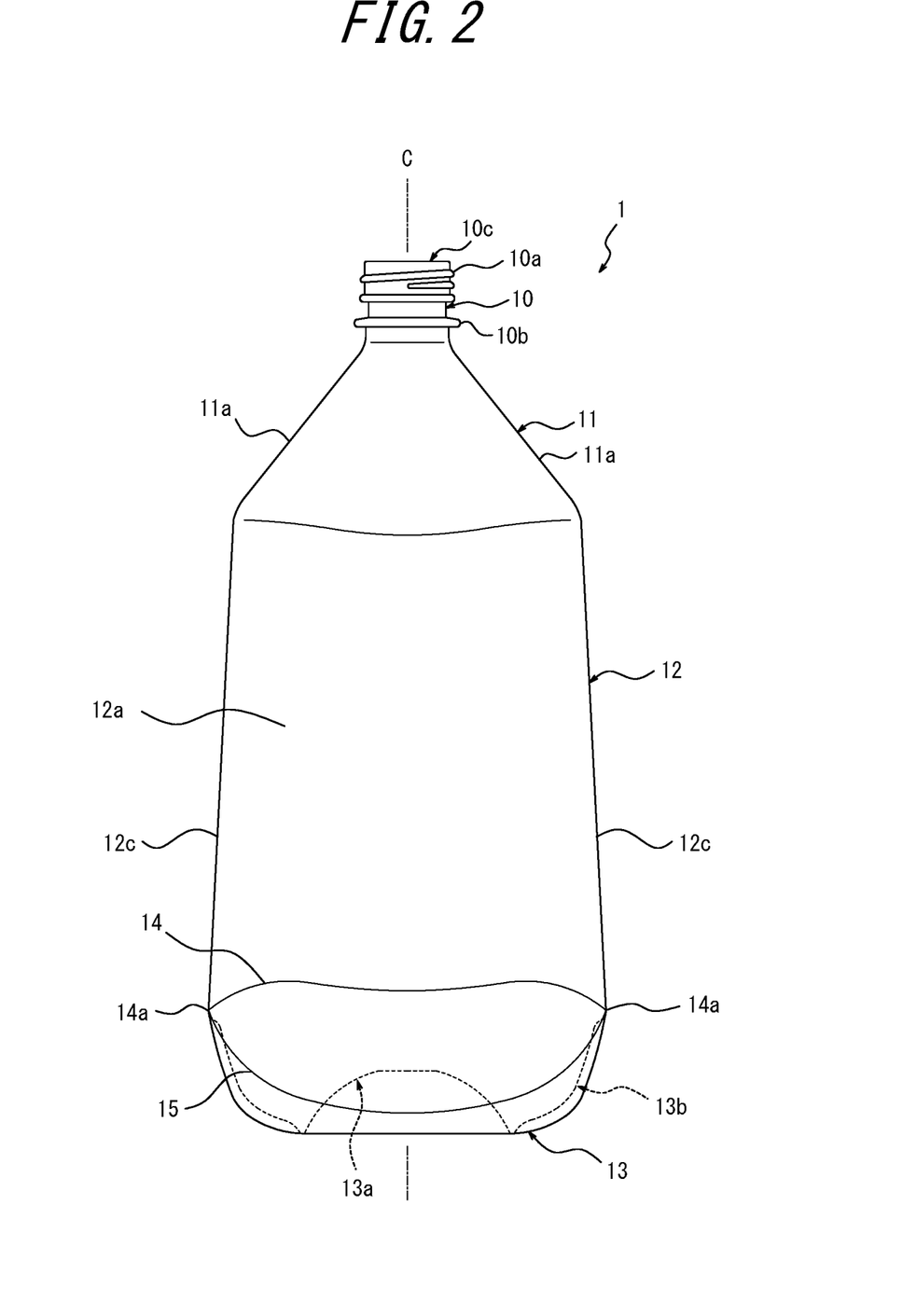
FIG. 2 is a front view of the synthetic resin container illustrated in FIG. 1.
Figure 3:
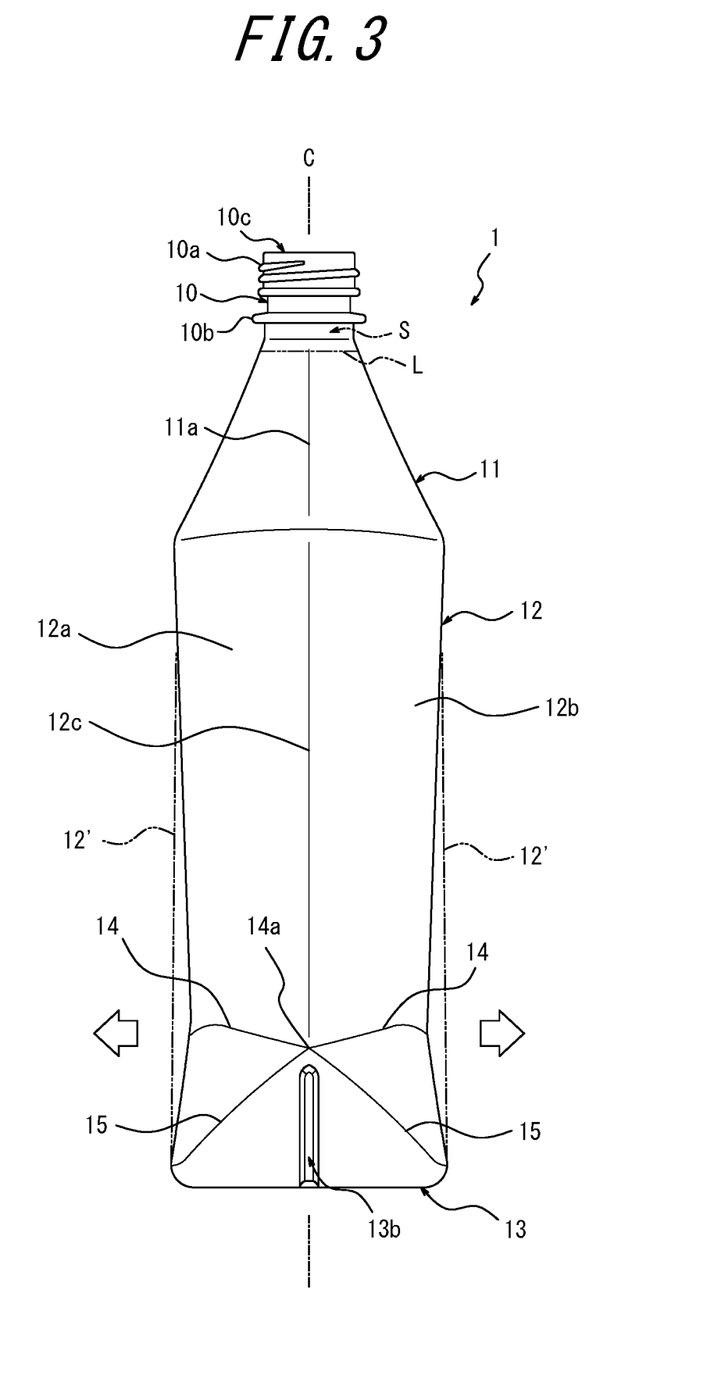
FIG. 3 is a side view of the synthetic resin container illustrated in FIG. 1.

The bottom 13 closes the lower end of the cylindrical body 12 and forms a grounding surface (bottom surface) that can ground in an upright posture illustrated in FIGS. 1 to 3. A recess 13a recessed inward of the container 1 is formed at the central portion of the bottom 13. In this example, the recess 13a is a substantially hemispherical curved surface. Further, a pair of grooves 13b is formed at the bottom 13, the grooves 13 extending in the width direction (long axis direction) at the central position in the thickness direction. Each groove 13b extends over the lower portion of the body 12 from the bottom 13. When the bottom 13 is folded, each groove 13b acts as a valley crease. That is, the container 1 according to this example is configured such that the bottom 13 can be folded by folding a pair of grooves 13b to the inside of the container 1. In that case, the folding line portions 15 provided at the boundary between the body 12 and the bottom 13 act as mountain creases. It is to be noted that, in this example, the folding line portion 15 is provided to each on the front side and the rear side of the container 1, and thus a pair of folding line portions 15 is connected to the connecting portion 14a. As illustrated in FIG. 3, in a side view, a pair of folding line portions 15 forms an upward protruded bending portion with the connecting portion 14a as a vertex.

The method of manufacturing a liquid container that has a storage space in which a liquid is stored includes a liquid blow molding step and a headspace forming step. The liquid blow molding step is a step of molding a container 1 having a storage space filled full with a liquid by placing a preform in a mold and performing liquid blow molding. In the headspace forming step, when a container 1 filled with a liquid is separated from a mold, the body 12 is deformed in the direction in which the thickness is increased in the area of the lateral folding line portion 14 and a volume of the storage space is increased, which causes a decline in a liquid level of the storage space (a headspace S is formed). The liquid blow molding step is a blow molding in which, as a pressurized medium (pressurized fluid) supplied to a preform, a pressurized liquid is used in place of pressurized air used for air blow molding, thus molding and filling are performed simultaneously. More specifically, for example, a preform can be molded into a container 1 having a predetermined shape conforming to an inner surface of a cavity of a mold by placing a body of a bottomed tubular shaped preform heated by a heater or the like to a predetermined temperature at which stretchability is achieved into a cavity of the mold and by supplying, at a predetermined pressure, a liquid into the preform through a nozzle.

A preform can be obtained by injection molding, extrusion blow molding, extrusion molding or the like by using thermoplastic synthetic resins such as polypropylene (PP), polyethylene terephthalate (PET) or the like as a raw material. As an example, a preform includes a bottomed tubular body and a mouth continuous to the body. The mouth is formed into a cylindrical shape, and the outer periphery thereof is integrally provided with a male thread. The body is formed into a test tube shape extending along the axis direction and having a circular cross-section, and is provided to the lower side of the mouth coaxially to and integrally with the mouth.

It is to be noted that, as a liquid supplied to a preform in the liquid blow molding, a liquid filled in a container 1 as a final product such as beverages, cosmetics, detergents, body soaps and the like can be used. In this manner a step of filling a liquid into a container 1 after molding is omitted and a productivity thereof can be enhanced.

As described above, in the container 1, by separating the container 1 filled with a liquid from a mold, the body 12 is deformed in the direction in which the thickness is increased in the area of the lateral folding line portion 14 and the volume of the storage space is increased. Therefore, after the liquid blow molding step, the container 1 before being separated from the mold is prevented from being deformed by the cavity of the mold and thus maintains the molded shape. Further, in the headspace forming step, when the mold is opened and the container 1 is separated from the mold, the body 12 is deformed by the inner pressure of a content liquid and the volume of the storage space is increased. Thus, in the headspace forming step, the liquid level L in the full state right after the liquid blow molding step is moved below the top opening 10c of the mouth 10 as indicated by the double dotted chain line in FIG. 3, and as a result a headspace S (an inner space above the liquid level L) is formed. In this manner, when the container 1 is ejected from the mold and transferred after the liquid blow molding, and when the container 1 is used (when a cap is opened), a desired sized headspace S is automatically formed, thus outflow of a content liquid can be prevented. It is to be noted that, after the liquid blow molding step, the container 1 may be separated from the mold by opening the mold after the blow nozzle is separated from the mouth 10 of the container 1, or the blow nozzle may be separated from the mouth 10 after the mold is opened. Further, for example, in the case where, after the liquid blow molding step, a stretching rod pulling step is performed, followed by a blow nozzle separating (mouth opening) step and a mold opening step, a small headspace S (a space corresponding to the volume of the stretching rod pulled out) is formed in the blow nozzle separating step. Further, when the container 1 is separated from the mold in the mold opening step, the headspace S is expanded, and a desired sized headspace S is formed. In the present disclosure, the headspace forming step includes a case where a headspace S is expanded as above described.

In this manner, according to the manufacturing method of this embodiment, a desired sized headspace S can be formed in the container 1 with a simple configuration accompanied by neither complex manufacturing step nor an increase in facility cost.

It is to be noted that, in this embodiment, in the side view, the lateral folding line portions 14 form a recessed bending portion in the thickness direction of the body 12. Thus, compared with the case where the lateral folding line portions 14 are formed into a flat shape or a protrusion in the side view, a large range of deformation in the thickness direction can be secured. That is, an increasing amount of the volume of the storage space due to deformation caused by expansion of the body 12 can be increased. In this manner, a larger headspace S can be formed, and a desired sized headspace S can be formed more easily.

It is to be noted that, in this embodiment, the lateral folding line portion 14 is provided at the lower half of the body 12. Thus, compared with the case where the lateral folding line portion 14 is provided at the upper half of the body 12, a larger hydraulic head pressure is applied to the lateral folding line portion 14. In this manner, a large distance is provided between the top opening 10c of the mouth 10 and the lateral folding line portion 14, which allows the body 12 to be expanded and deformed easily, and as a result a desired sized headspace S can be formed more easily.

Further, in this embodiment, the lateral folding line portion 14 is formed into a wavy line shape in the front view. Thus, compared with the case where the lateral folding line portion 14 is formed into a linear shape in the front view, the range of deformation of the body 12 in the thickness direction in the area of the lateral folding line portion 14 is increased. In this manner, a desired sized headspace S can be formed more easily.

Further, in this embodiment, the lateral folding line portion 14 is provided to each of the front wall 12a and the rear wall 12b. Thus, compared with the case where the lateral folding line portion 14 is provided to either one of them, the body 12 can be expanded and deformed more easily in the thickness direction. In this manner, a desired sized headspace S can be formed more easily.

Further, it is preferable that the thickness direction of the container 1 is aligned with the opening/closing direction of the mold, which allows the body 12 to be deformed in the thickness direction in the mold opening process, and at the same time a headspace S is formed. In this manner, outflow of a content liquid can be also prevented in the mold opening process. It is to be noted that, in this case, a parting line formed by a split surface of the mold is formed along the center in the thickness direction. That is, a parting line is formed along the longitudinal folding line 11a of the shoulder 11, the longitudinal folding line 12c of the body 12 and the groove 13b of the bottom 13.

Another embodiment of the present disclosure will be described below with reference to FIGS. 6 and 7. It is to be noted that the parts having the same basic functions as those described above are assigned with the same reference signs in the drawing, and explanation thereof will be omitted.

Figure 6:
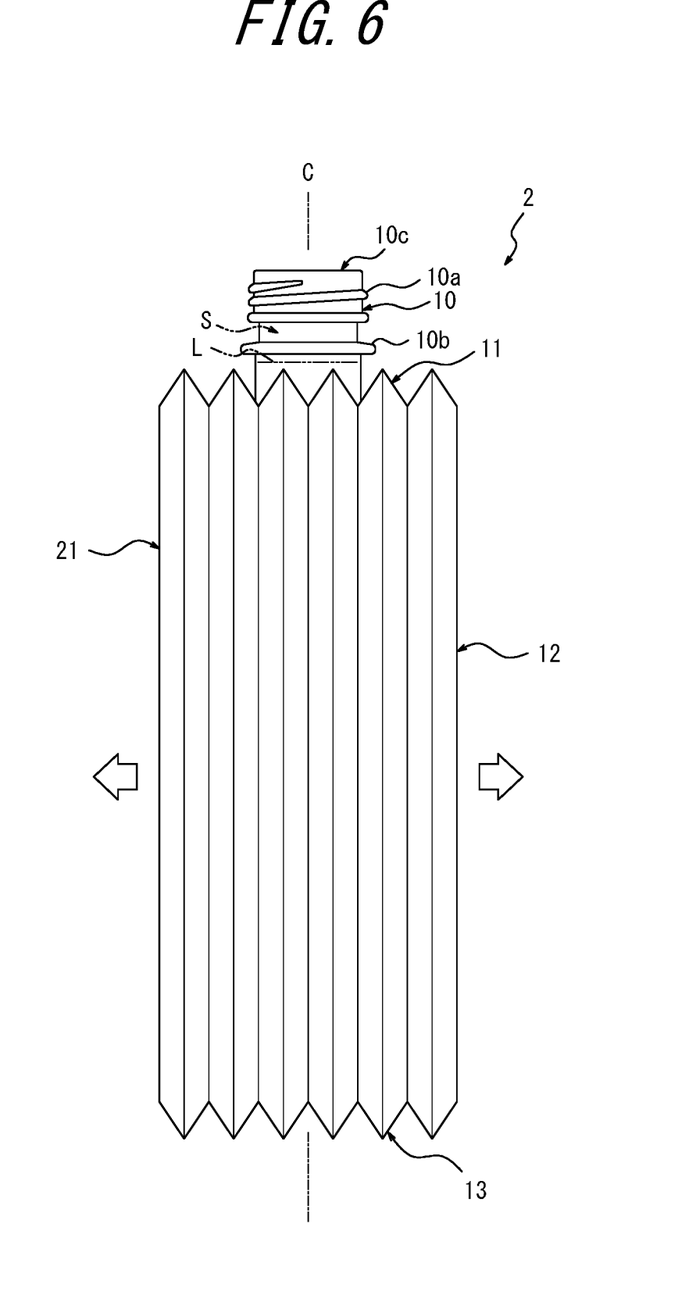
FIG. 6 is a front view of a synthetic resin container as a variation.
Figure 7:
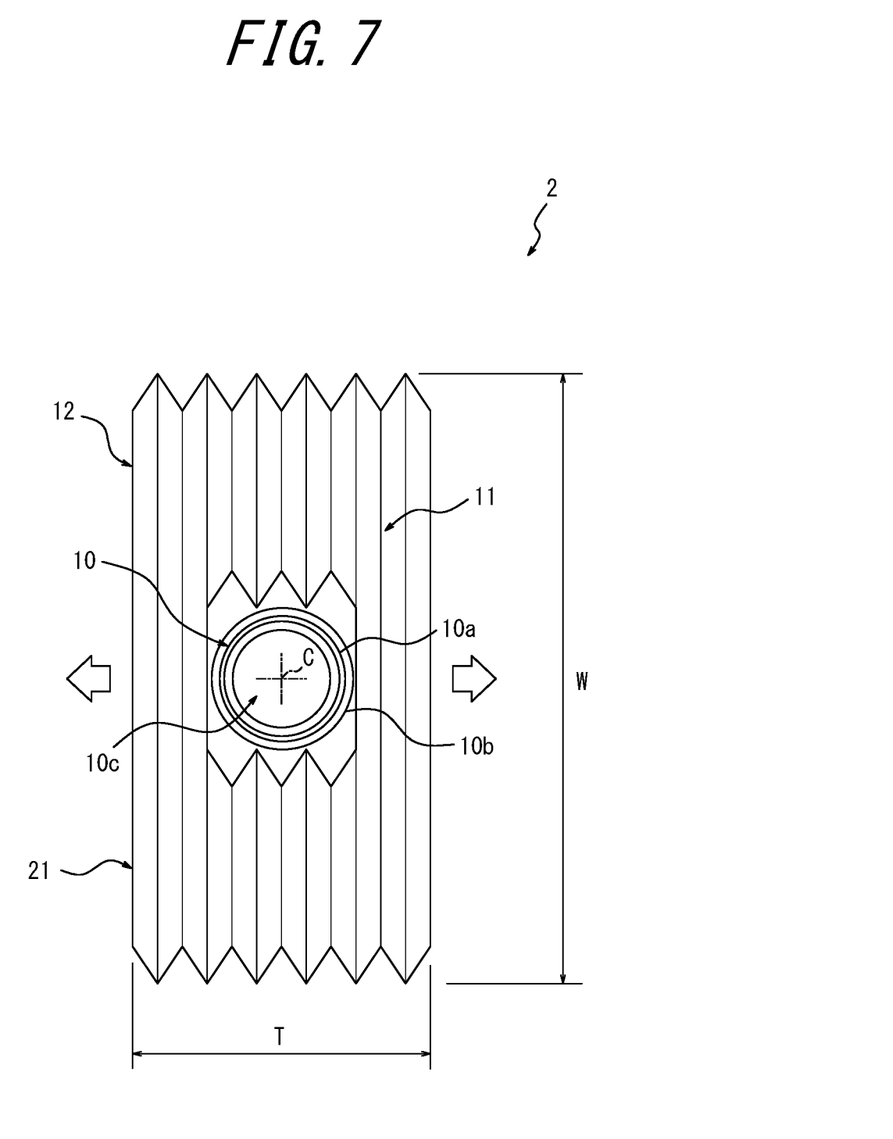
FIG. 7 is a plan view of the synthetic resin container illustrated in FIG. 6.

As illustrated in FIGS. 6 and 7, a synthetic resin container 2 has a bellows portion 21 composed of a plurality of recesses and protrusions and being expandable and contractible in the direction perpendicular to the central axis line C. It is to be noted that it is enough for the bellows portion 21 to have at least one recess and protrusion. Further, in this example, the entire body 12 forms the bellows portion 21. That is, although the bellows portion 21 is provided throughout the thickness direction, the width direction and the height direction of the body 12, the bellows portion 21 may be provided to only a part of the thickness direction, the width direction and the height direction of the body 12. For example, when the bellows portion is provided to only the lower half of the body 12, it is formed into a hand fan shape in which a contraction width of the bellows is gradually increased downward. Further, the bellows portion 21 according to this example has a flattened substantially rectangular parallelepiped shape in which the width is larger than the thickness, and the upper surface thereof forms the shoulder 11 and the bottom surface thereof forms the bottom 13. That is, a plurality of recesses and protrusions continuous to the body 12 are formed also at the shoulder 11 and the bottom 13. It is to be noted that, in this embodiment, the body 12 is not necessarily a flattened shape, and the thickness and the width of the body 12 may be the same.

In the container 2 configured in the above described manner, when the container 2 filled with a liquid is separated from a mold, the body 12 is deformed such that the bellows portion 21 expands in the expansion/contraction direction (see arrows in FIGS. 6 and 7), and the volume of the storage space is increased. Therefore, as with the above described container 1, when the mold is opened to eject the container 2 (the container 2 is separated from the mold) in the headspace forming step after the liquid blow molding step, the liquid level L moves downward from the top opening 10c of the mouth 10 and a headspace S is formed automatically. It is to be noted that the bellows portion may be configured to be expandable and contractible in the axial direction of the body 12 as long as the storage space volume is increased.

Therefore, a desired sized headspace S can be formed in the container 2 with a simple configuration accompanied by neither complex manufacturing step nor an increase in facility cost also in this embodiment.

Further, in this embodiment, the bellows portion 21 is provided all over the height direction of the body 12, which increases an amount of increase in the volume of the storage space when the bellows portion 21 is opened. In this manner, a desired sized headspace S can be formed more easily. It is to be noted that, after use of the container 2, the body 12 can be folded easily by compressing the bellows portion 21.

The above description is merely an embodiment of the present disclosure, and various changes may be made to the scope of claims. For example, instead of the male thread 10a of the mouth 10, a protrusion may be provided for undercut engagement with a cap and the like, and in this case, a cap and the like can be plugged into the mouth 10, for example. Further, in the container 1 according to this example, the shoulder 11, the body 12 and the bottom 13 are symmetrical in the thickness direction (symmetrical in the fore/aft direction) and symmetrical in the width direction (symmetrical in the right/left direction), but is not limited thereto, and any one of or all of the shoulder 11, the body 12 and the bottom 13 may be asymmetrical in the fore/aft direction or asymmetrical in the right/left direction. Further, the bottom 13 may be configured not to form a grounding surface that can ground the container 1 in an upright state, and may be formed of a hemispherical curved surface that bulges downward, for example. Moreover, when a headspace S is formed, a method of forming a headspace by sucking back a part of a liquid filled in a storage space of a container to the supply side or a method of forming a headspace by pulling up a stretching rod inserted into the storage space may be used as an auxiliary method.

REFERENCE SIGNS LIST 1, 2 synthetic resin container
10 mouth
10a male thread
10b neck ring
10c top opening
11 shoulder
11a longitudinal folding line portion
12 body
12a front face wall
12b rear face wall
12c longitudinal folding line portion
13 bottom
13a recess 13b groove
14 lateral folding line portion
14a connecting portion
15 folding line portion
21 bellows portion
C central axis line
S headspace

The invention claimed is:

1. A method of manufacturing a liquid container in which a liquid is stored in a storage space of the container, the container including a mouth, a body and a bottom, the body including a lateral folding line portion that is configured to be foldable when the body is flattened in a thickness direction, the lateral folding line portion extending in a circumferential direction of the body, the method comprising:
performing liquid blow molding on a preform placed in a mold to form the container in which the storage space is filled with the liquid; and
forming a headspace in the container by separating the container filled with the liquid from the mold such that the body is deformed by inner pressure of the liquid in the thickness direction so that a thickness of the body is increased in an area of the lateral folding line portion and a volume of the storage space is increased.

2. The liquid container manufacturing method according to claim 1, wherein the lateral folding line portion is provided at a bottom half of the body such that the lateral folding line portion is closer to the bottom than the lateral folding line portion is to the mouth along an axial direction of the body.

3. The liquid container manufacturing method according to claim 1, wherein
the body has a front wall and a rear wall disposed opposite to each other in the thickness direction of the body; and
the lateral folding line portion is provided to each of the front wall and the rear wall.

4. The liquid container manufacturing method according to claim 1, wherein the body has a flattened shape in which a width is larger than a thickness.

5. The liquid container manufacturing method according to claim 2, wherein the lateral folding line portion forms a recessed bending portion in the thickness direction of the body.

6. The liquid container manufacturing method according to claim 2, wherein the lateral folding line portion is provided at a bottom half of the body such that the lateral folding line portion is closer to the bottom than the lateral folding line portion is to the mouth along an axial direction of the body.

7. The liquid container manufacturing method according to claim 2, wherein
the body has a front wall and a rear wall disposed opposite to each other in the thickness direction of the body; and
the lateral folding line portion is provided to each of the front wall and the rear wall.

8. The liquid container manufacturing method according to claim 1, wherein the lateral folding line portion forms a recessed bending portion in the thickness direction of the body.

9. The liquid container manufacturing method according to claim 3, wherein the lateral folding line portion is provided at a bottom half of the body such that the lateral folding line portion is closer to the bottom than the lateral folding line portion is to the mouth along an axial direction of the body.

10. The liquid container manufacturing method according to claim 3, wherein
the body has a front wall and a rear wall disposed opposite to each other in the thickness direction of the body; and
the lateral folding line portion is provided to each of the front wall and the rear wall.

11. The liquid container manufacturing method according to claim 4, wherein
the body has a front wall and a rear wall disposed opposite to each other in the thickness direction of the body; and
the lateral folding line portion is provided to each of the front wall and the rear wall.

12. The liquid container manufacturing method according to claim 8, wherein the lateral folding line portion is provided at a bottom half of the body such that the lateral folding line portion is closer to the bottom than the lateral folding line portion is to the mouth along an axial direction of the body.

13. The liquid container manufacturing method according to claim 8, wherein
the body has a front wall and a rear wall disposed opposite to each other in the thickness direction of the body; and
the lateral folding line portion is provided to each of the front wall and the rear wall.

14. The liquid container manufacturing method according to claim 9, wherein
the body has a front wall and a rear wall disposed opposite to each other in the thickness direction of the body; and
the lateral folding line portion is provided to each of the front wall and the rear wall.

15. The liquid container manufacturing method according to claim 10, wherein
the body has a front wall and a rear wall disposed opposite to each other in the thickness direction of the body; and
the lateral folding line portion is provided to each of the front wall and the rear wall.

16. The liquid container manufacturing method according to claim 11, wherein
the body has a front wall and a rear wall disposed opposite to each other in the thickness direction of the body; and
the lateral folding line portion is provided to each of the front wall and the rear wall.

17. A method of manufacturing a liquid container in which a liquid is stored in a storage space of the container, the container including a mouth, a body and a bottom, the body including a bellows portion configured to be expandable and contractible in a direction perpendicular to a central axis line of the body, the method comprising:
performing liquid blow molding on a preform placed in a mold to form the container in which the storage space is filled with the liquid; and
forming a headspace in the container by separating the container filled with the liquid from the mold such that the bellows portion is expanded by inner pressure of the liquid and a volume of the storage space is increased.

18. The liquid container manufacturing method according to claim 6, wherein the bellows portion is provided all over the body in a height direction extending along the central axis line of the body.

* * * * *